(12) United States Patent
Fan et al.

(10) Patent No.: US 12,744,061 B2
(45) Date of Patent: Sep. 22, 2026

(54) STORAGE DEVICE BRACKET

(71) Applicant: Jabil Circuit (Singapore) Pte. Ltd., Singapore (SG)

(72) Inventors: Hsun-Wei Fan, Taichung City (TW); Chen-Hsuan Hsu, Taichung City (TW); Chung-Ju Wang, Taichung City (TW); Kuo-Hsing Yang, Taichung City (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 38 days.

(21) Appl. No.: 18/982,278

(22) Filed: Dec. 16, 2024

(65) Prior Publication Data

US 2025/0210067 A1 Jun. 26, 2025

(30) Foreign Application Priority Data

Dec. 22, 2023 (CN) ......................... 202323528847.0

(51) Int. Cl.
*G11B 33/12* (2006.01)

(52) U.S. Cl.
CPC .................................. *G11B 33/123* (2013.01)

(58) Field of Classification Search
CPC .................................................... G11B 33/123
See application file for complete search history.

(56) References Cited

U.S. PATENT DOCUMENTS 6,798,652 B2 * 9/2004 Wang ...................... G06F 1/184 361/679.33
7,375,922 B2 * 5/2008 Chen ....................... G06F 1/184
7,403,381 B2 * 7/2008 Chen .................... G11B 33/123 360/99.15
7,440,271 B2 * 10/2008 Chen ....................... G06F 1/187 248/539
7,616,436 B2 * 11/2009 DeMoss .................. G06F 1/187 312/223.1
7,995,337 B2 * 8/2011 Kuo ....................... G11B 33/08 361/679.33
8,584,999 B2 * 11/2013 Liu ......................... G06F 1/187 248/222.12
9,165,608 B2 * 10/2015 Tsai ........................ G06F 1/184
9,412,418 B2 * 8/2016 Hu .......................... G06F 1/187
10,111,354 B2 10/2018 Hu
11,871,533 B2 * 1/2024 Liu ...................... H05K 7/1489

* cited by examiner

*Primary Examiner* — Anita M King
(74) *Attorney, Agent, or Firm* — Young Basile Hanlon & MacFarlane, P.C.

(57) ABSTRACT

A storage device bracket configured to hold and position a storage device includes a bracket body and at least one positioning assembly. The storage device has first and second grooves respectively provided on two opposite sides thereof. The bracket body defines a receiving space for receiving the storage device. The at least one positioning assembly includes an engaging hook and an elastic engaging plate respectively provided on two opposite sides of the bracket body. The engaging hook protrudes from one of the opposite sides of the bracket body into the receiving space, and is configured to be removably inserted into the first groove. The elastic engaging plate has an elastic plate portion, and a protrusion connected to and protruding from the elastic plate portion into the receiving space for insertion into the second groove so as to limit movement of the storage device relative to the storage device bracket.

13 Claims, 9 Drawing Sheets

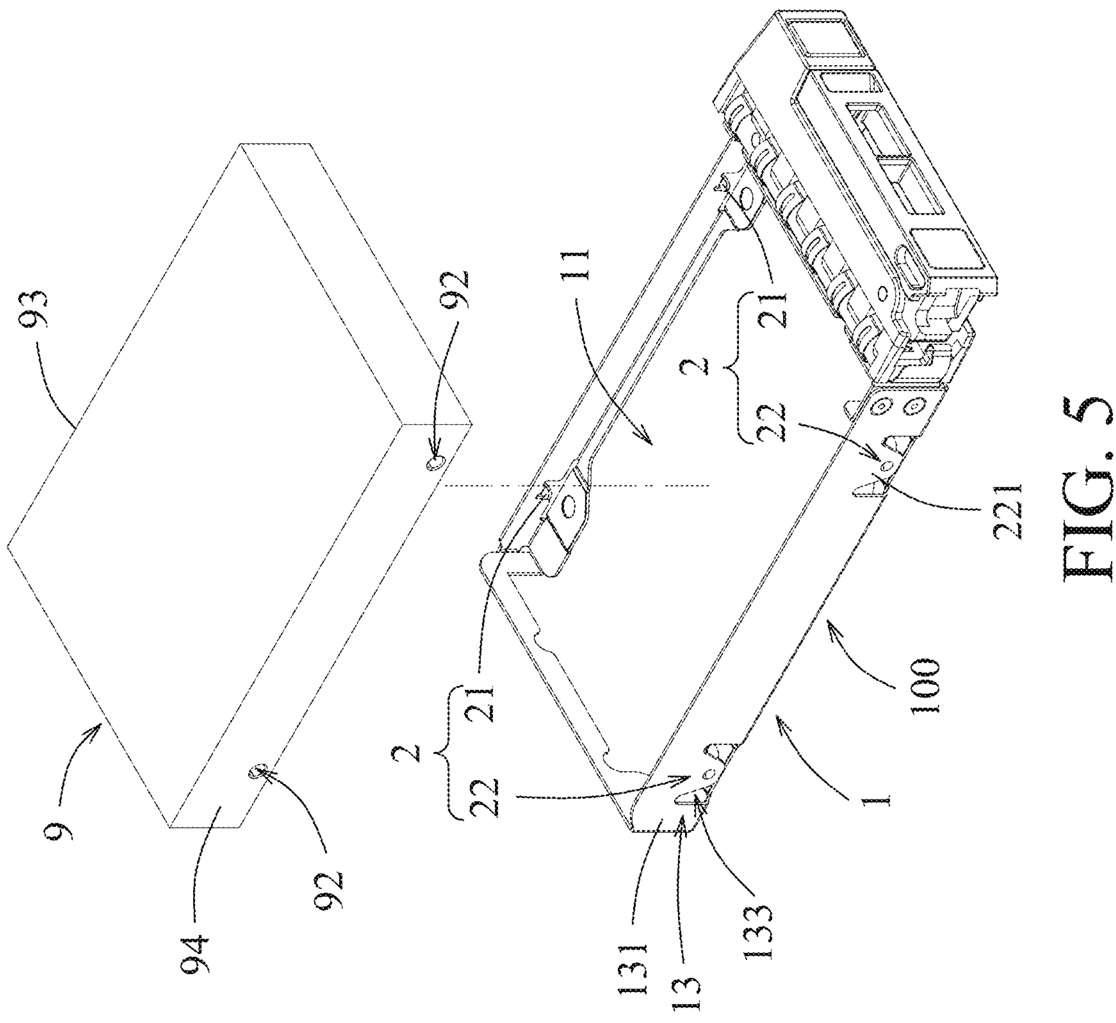
FIG. 5
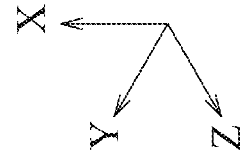

STORAGE DEVICE BRACKET

CROSS-REFERENCE TO RELATED APPLICATION

This application claims priority to Chinese Utility Model patent application Ser. No. 202323528847.0, filed on Dec. 22, 2023, and incorporated by reference herein in its entirety.

FIELD

The present disclosure relates to a bracket, and more particularly to a storage device bracket.

BACKGROUND

An existing storage device bracket usually uses a plurality of screws to fix the storage device thereto. However, the storage device may not be stably held and positioned by the existing storage device bracket, so that fixing of the storage device on the existing storage device bracket may be difficult. Hence, there is room for improvement of the existing storage device bracket.

SUMMARY

Therefore, an object of the present disclosure is to provide an improved storage device bracket that can stably hold and position a storage device thereto.

According to this disclosure, the storage device bracket is configured to hold and position a storage device, and includes a bracket body and at least one positioning assembly. The storage device has a first groove and a second groove respectively provided on two opposite sides of the storage device. The bracket body defines a receiving space for receiving the storage device. The at least one positioning assembly includes an engaging hook and an elastic engaging plate respectively provided on two opposite sides of the bracket body. The engaging hook protrudes from one of the two opposite sides of the bracket body into the receiving space, and is configured to be removably inserted into the first groove. The elastic engaging plate has an elastic plate portion, and a protrusion connected to and protruding from the elastic plate portion into the receiving space for insertion into the second groove so as to limit movement of the storage device relative to the storage device bracket.

BRIEF DESCRIPTION OF THE DRAWINGS

Other features and advantages of the disclosure will become apparent in the following detailed description of the embodiment with reference to the accompanying drawings. It is noted that various features may not be drawn to scale.

FIG. 5 is an exploded perspective view of FIG. 4.

DETAILED DESCRIPTION

Figure 1:
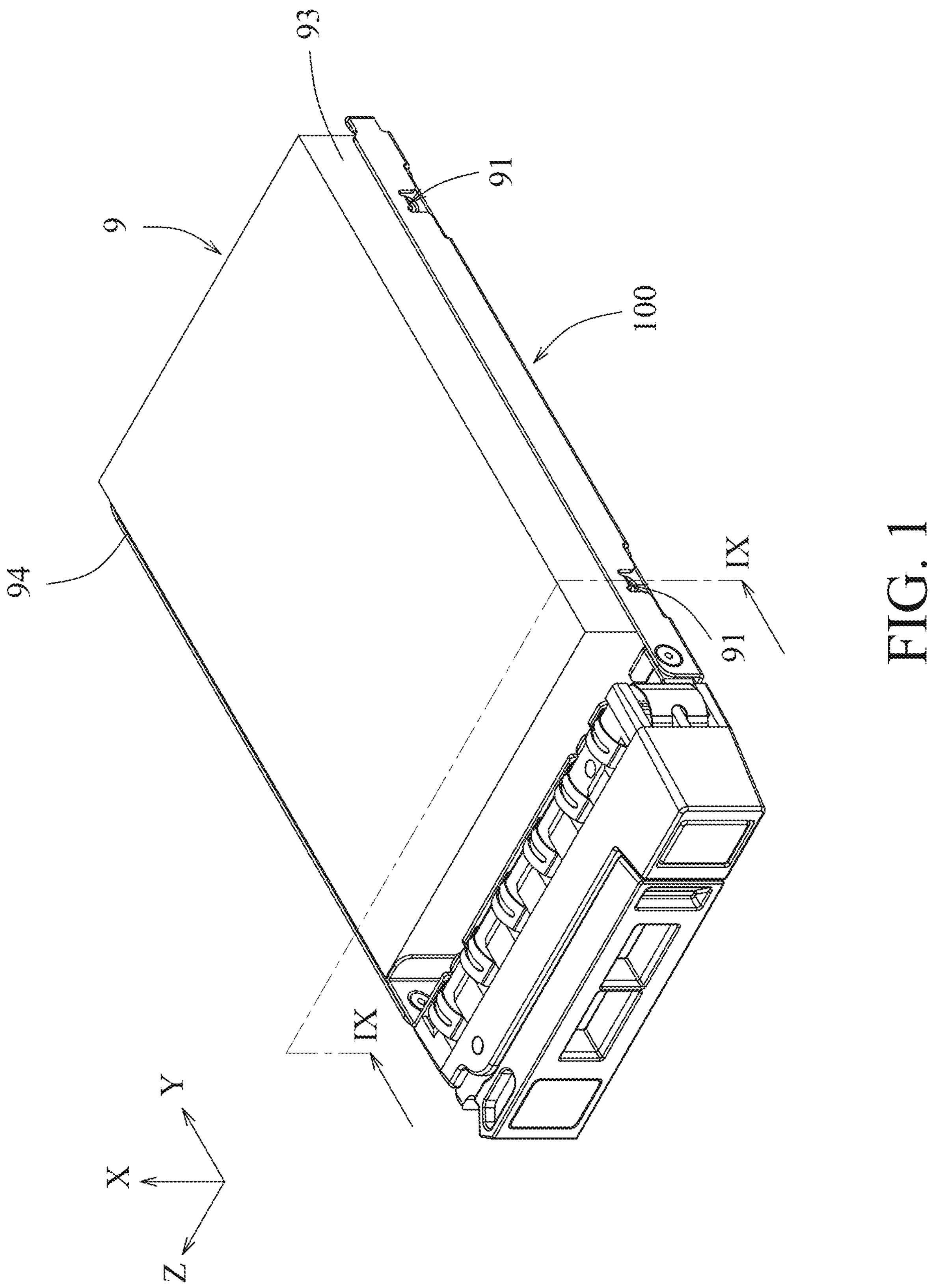
FIG. 1 is a perspective view of a storage device bracket according to an embodiment of the present disclosure with a storage device mounted thereto.
Figure 2:
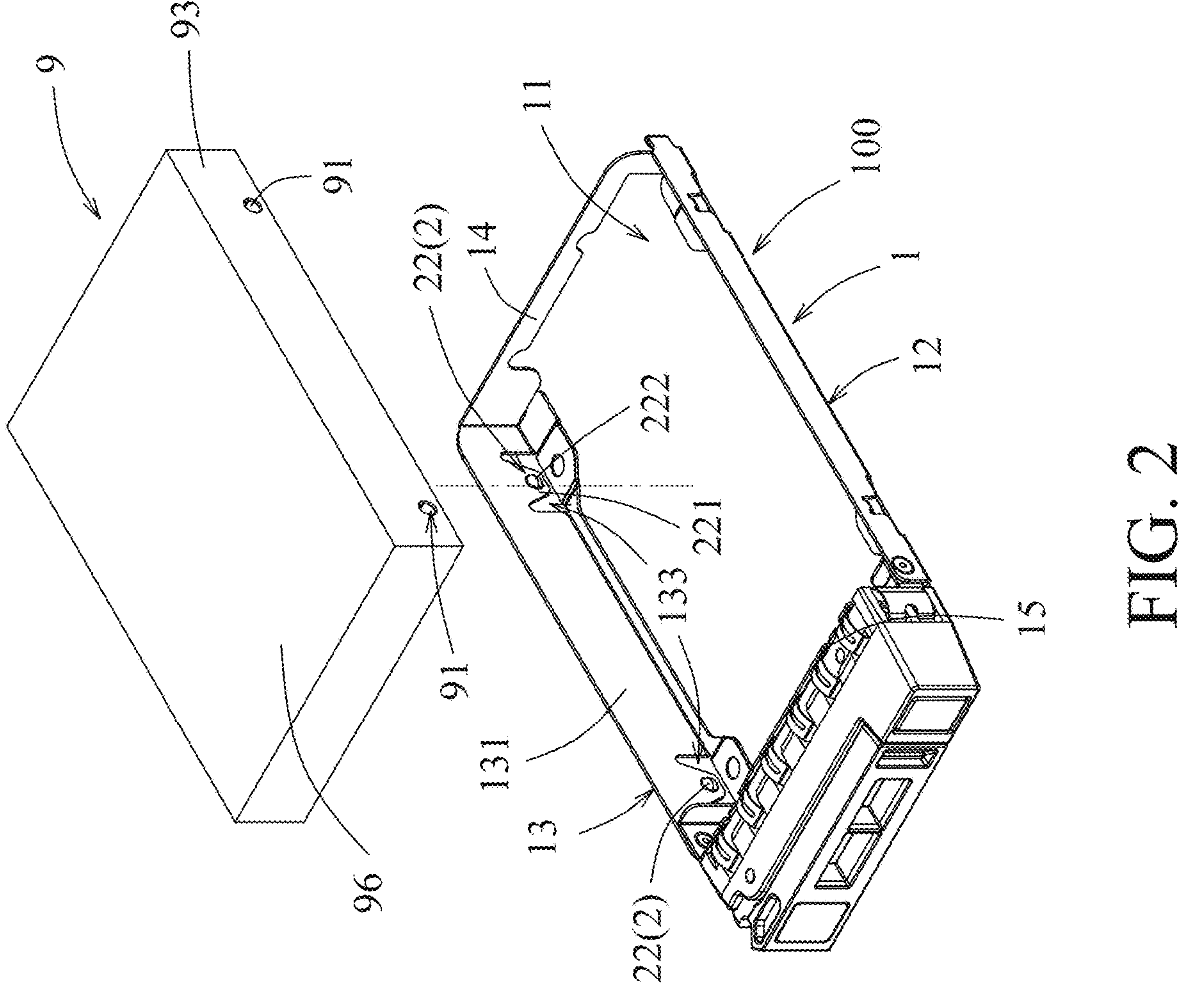
FIG. 2 is an exploded perspective view of FIG. 1.
Figure 2:
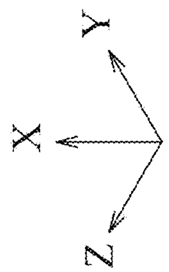
Figure 3:
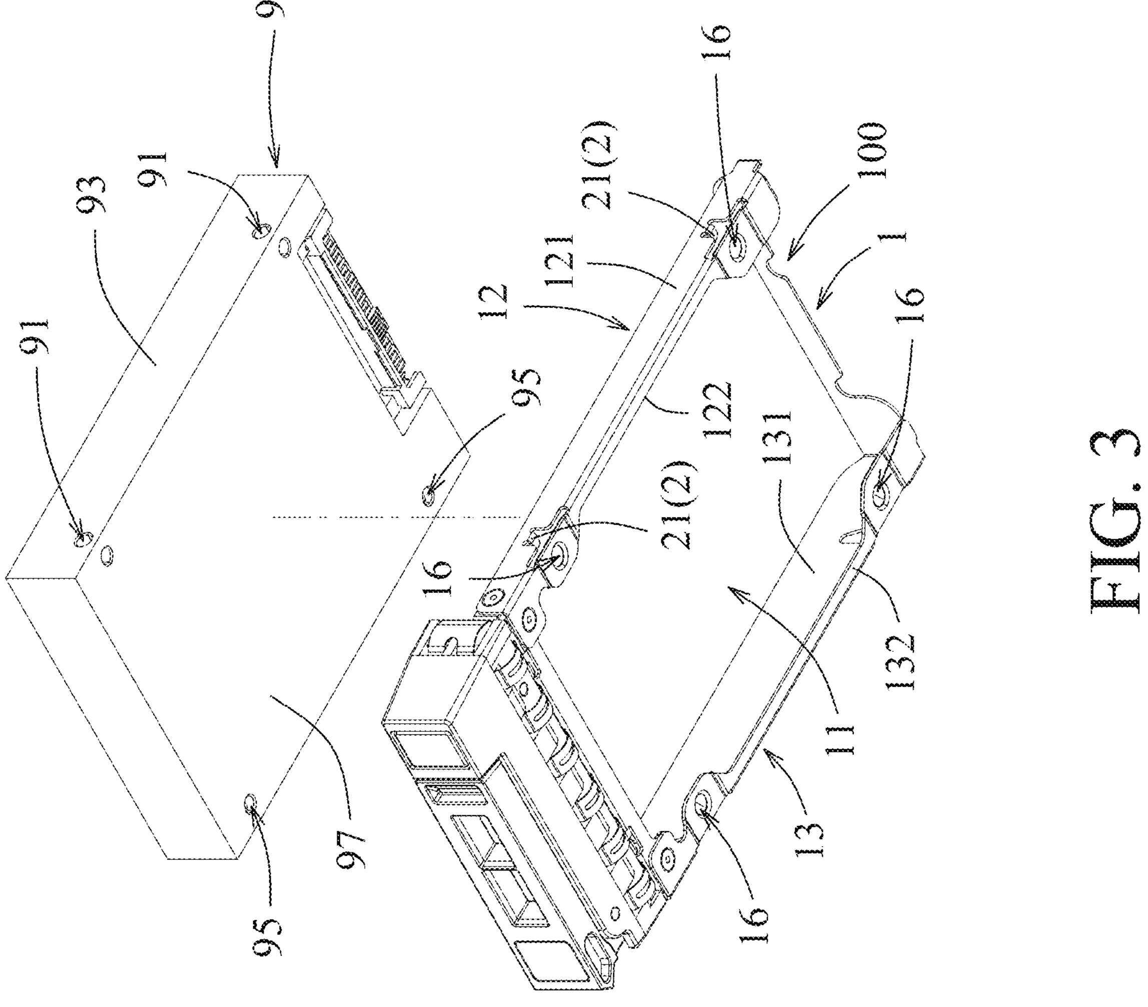
FIG. 3 is a view similar to FIG. 2, but taken from another angle.
Figure 3:
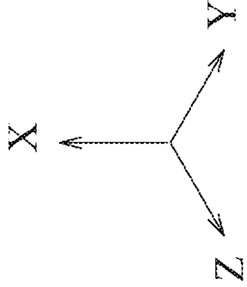
Figure 4:
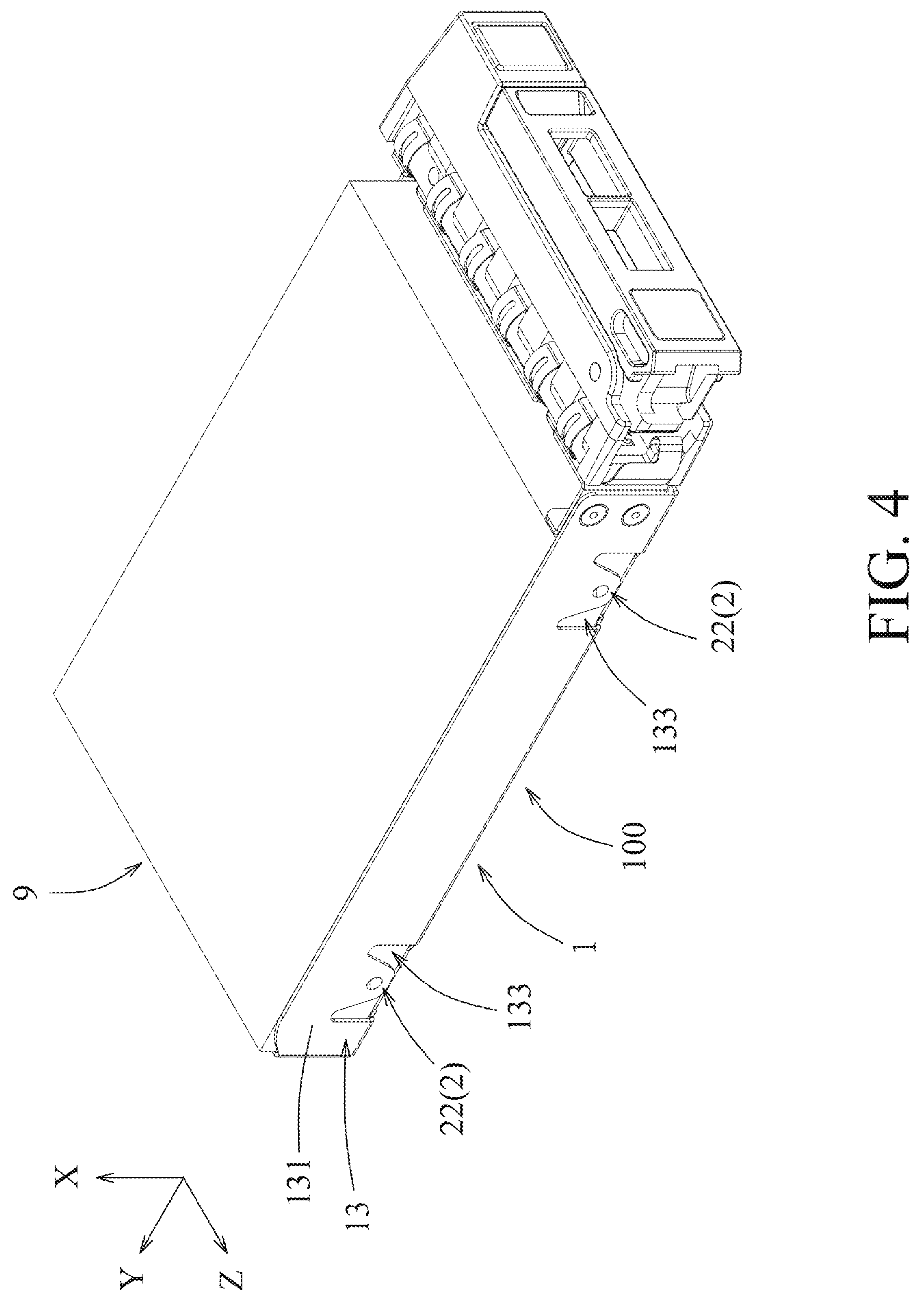
FIG. 4 is a view similar to FIG. 1, but taken from another angle.

Referring to FIGS. 1 to 5, a storage device bracket 100 according to an embodiment of the present disclosure is configured to hold and position a storage device 9. The storage device 9 is, for example, but not limited to, a hard disk, and has a rectangular structure. The storage device 9 includes a first sidewall 93 and a second sidewall 94 opposite to each other in a left-right direction (Z), a top wall 96 connected between top ends of the first and second sidewalls 93, 94, and a bottom wall 97 connected between bottom ends of the first and second side walls 93, 94 and formed with four spaced-apart fastening holes 95 (see FIG. 3). In this embodiment, the first and second sidewalls 93, 94 are left and right sidewalls of the storage device 9. An outer surface of the first sidewall 93 is formed with two first grooves 91 respectively provided on front and rear ends thereof. An outer surface of the second sidewall 94 is formed with two second grooves 92 respectively provided on front and rear ends thereof. Each first groove 91 has an opening facing toward a left direction, and each second groove 92 has an opening facing toward a right direction. Two of the fastening holes 95 are respectively adjacent to the first grooves 91, and the other two fastening holes 95 are respectively adjacent to the second grooves 92. However, the configuration of the storage device 9 is not limited to the aforesaid description, and may adjusted according to actual requirements. For example, the first and second sidewalls 93, 94 may be opposite to each other in a front-rear direction (Y), the opening of each first groove 91 may face toward a front direction, and the opening of each second groove 92 may face toward a rear direction. Furthermore, the number of each of the first and second grooves 91, 92 may be one, three or more, the number of the fastening holes 95 may be one, two, three, five or more, or the fastening holes 95 may be omitted. Hence, the number of the first and second grooves 91, 92 and the fastening holes 95 is not limited to a specific number.

The storage device bracket 100 of this embodiment includes a bracket body 1 for holding the storage device 9, and a plurality of positioning assemblies 2 for positioning the storage device 9 on the bracket body 1. Two positioning assemblies 2 respectively disposed on front and rear sides of the bracket body 1 will be exemplified in this embodiment. The bracket body 1 is generally hollow rectangular in shape, and defines a receiving space 11 for receiving the storage device 9. Specifically, the bracket body 1 includes a first side frame 12 and a second side frame 13 opposite to each other in the left-right direction (Z), a third side frame 14 connected between rear ends of the first and second side frames 12, 13, and a fourth side frame 15 connected between front ends of the first and second side frames 12, 13. The first side frame 12 has a first upright plate 121 extending in the front-rear direction (Y), and a first bottom plate 122 extending transversely from a bottom end of the first upright plate 121 toward the second side frame 13 in the left-right direction (Z). The first bottom plate 122 is used to support a bottom end of the first sidewall 93. The second side frame 13 has a second upright plate 131 extending in the front-rear direction (Y), and a second bottom plate 132 extending transversely from a bottom end of the second upright plate 131 toward the first side frame 12 in the left-right direction (Z). The second bottom plate 132 is used to support a bottom end of the second sidewall 94. The second side frame 13 further has two through grooves 133 (see FIGS. 2 and 4) respectively provided on and respectively extending through front and rear ends of the second upright plate 131 in the left-right direction (Z). The first upright plate 121, the first bottom plate 122, the second upright plate 131, the second bottom plate 132, the third side frame 14 and the fourth side frame 15 cooperatively define the receiving space 11. In this embodiment, the number of the through grooves 133 corresponds to the number of the positioning assemblies 2, and the positions of the through grooves 133 are respectively aligned with the positions of the second grooves 92, but are not limited thereto. In addition, any one of the third and fourth side frames 14, 15 connected between the first and second side frames 12, 13 can strengthen the overall structure of the bracket body 1. However, in other embodiments, the third side frame 14 may be omitted, and only the fourth side frame 15 is connected between the first and second side frames 12, 13.

Each positioning assembly 2 includes an engaging hook 21 disposed on a corresponding one of the front and rear ends of the first side frame 12, and an elastic engaging plate 22 disposed on a corresponding one of the front and rear ends of the second side frame 13. Specifically, the engaging hooks 21 of the positioning assemblies 2 respectively protrude from front and rear ends of the first upright plate 121 into the receiving space 11, and the elastic engaging plates 22 of the positioning assemblies 2 are respectively provided on front and rear ends of the second upright plate 131. The engaging hooks 21 are inserted removably and respectively into the first grooves 91 so as to prevent movement of the first sidewall 93 of the storage device 9 relative to the storage device bracket 100 in the front-rear direction (Y) or the up-down direction (X). In this embodiment, the engaging hooks 21 are integrally formed as one piece with the first upright plate 121. That is, each engaging hook 21 is formed by cutting a portion of the first upright plate 121 and then bending the portion thereof inwardly.

Furthermore, the bracket body 1 has four through holes 16 respectively corresponding in position to the fastening holes 95. Specifically, two of the through holes 16 are formed in and extend through the first bottom plate 122 in an up-down direction (X), and are spaced apart from each other in the front-rear direction (Y), while the other two through holes 16 are formed in and extend through the second bottom plate 132 in the up-down direction (X), and are spaced apart from each other in the front-rear direction (Y). The through holes 16 are configured for extension of a plurality of fixing members (not shown), such as screws, respectively therethrough to respectively engage the fastening holes 95, thereby securely fixing the storage device 9 to the bracket body 1. However, in other embodiments, the number of the through holes 16 may be less than that of the fastening holes 95, for example, one, two, three, or omitted, so that the through holes 16 may only align with one or some of the fastening holes 95, and may be adjusted according to actual fixing requirement.

Each elastic engaging plate 22 has an elastic plate portion 221, and a protrusion 222 connected to and protruding from the elastic plate portion 221 into the receiving space 11. Specifically, the elastic plate portion 221 of each elastic engaging plate 22 extends downwardly from an upper wall of a respective one of the through grooves 133, and is capable of elastic displacement in the left-right direction (Z). The protrusions 222 of the elastic engaging plates 22 are inserted removably and respectively into the second grooves 92 so as to prevent movement of the second sidewall 94 of the storage device 9 relative to the storage device bracket 100 in the front-rear direction (Y) and the up-down direction (X) at the same time when no external force is applied thereto.

In the foregoing description, the number of the positioning assemblies 2 exemplified in this embodiment is two, and the engaging hooks 21 and the elastic engaging plates 22 of the positioning assemblies 2 are respectively connected to the first and second side frames 12, 13 of the bracket body 1. However, in other embodiments, the engaging hook 21 and the elastic engaging plate 22 of each positioning assembly 2 may be respectively provided on the third and fourth side frames 14, 15 of the bracket body 1 depending on the mounting direction of the storage device 9. In addition, the number of the positioning assemblies 2 may also be only one or three or more than three, which can similarly prevent movement of the storage device 9 relative to the storage device bracket 100. The greater the number of the positioning assemblies 2, the more securely the storage device 9 can be positioned. However, only one positioning assembly 2 may also facilitate mounting of the storage device 9 on the storage device bracket 100.

Referring to FIGS. 6 to 9, when the engaging hooks 21 are respectively inserted into the first grooves 91 of the storage device 9 so as to position the first sidewall 93 of the storage device 9 in the receiving space 11, and when the elastic engaging plates 22 are pushed by the second sidewall 94 of the storage device 9 through the protrusions 222 thereof so as to elastically displace the elastic plate portions 221 thereof away from the second side frame 13 and away from the receiving space 11, the protrusions 222 are moved along with the elastic plate portions 221 away from the receiving space 11, so as to allow the second sidewall 94 of the storage device 9 to be inserted into or pulled out of the receiving space 11.

Figure 6:
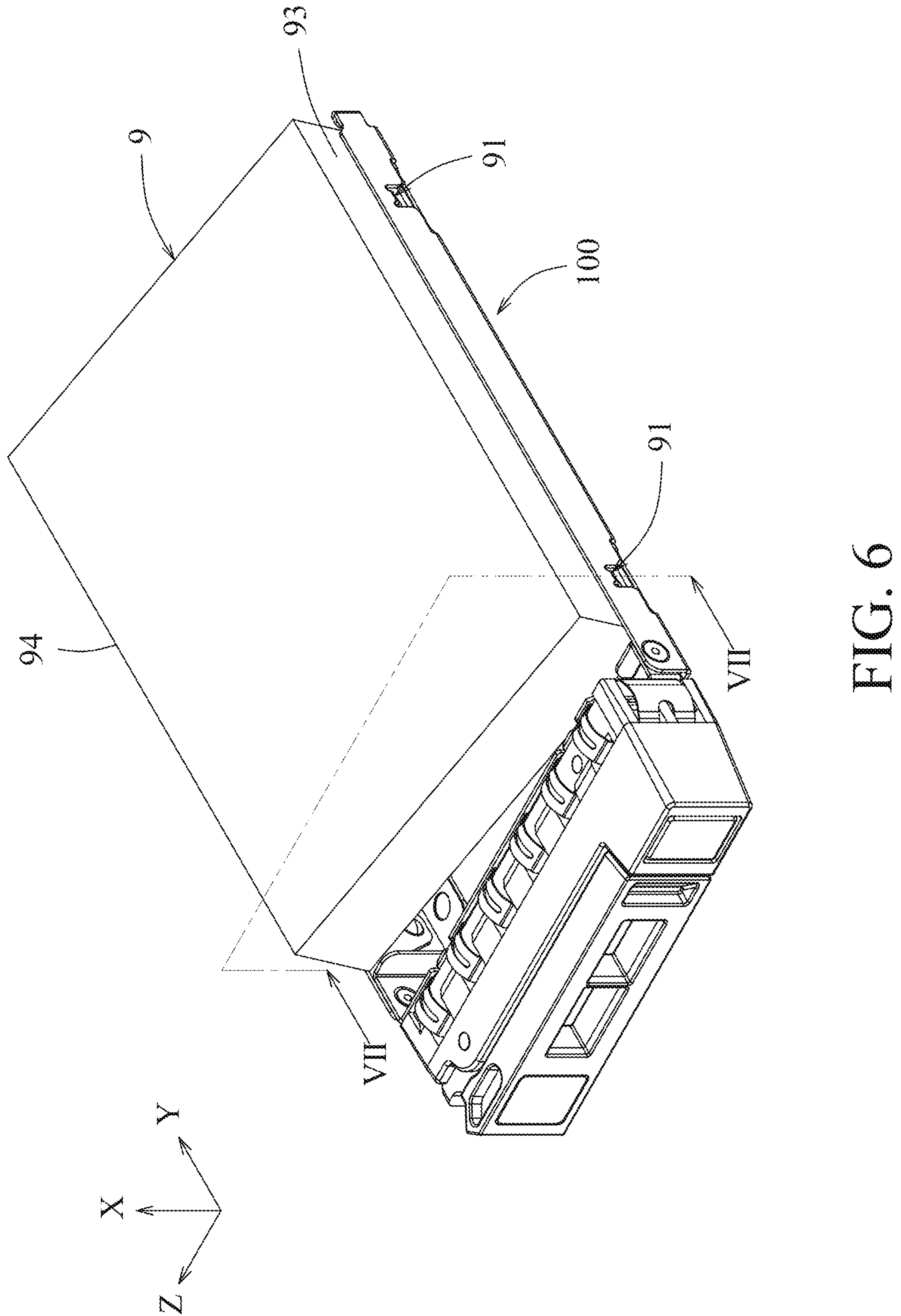
FIG. 6 is a perspective view, illustrating a second side wall of the storage device being away from a receiving space of the embodiment.
Figure 7:
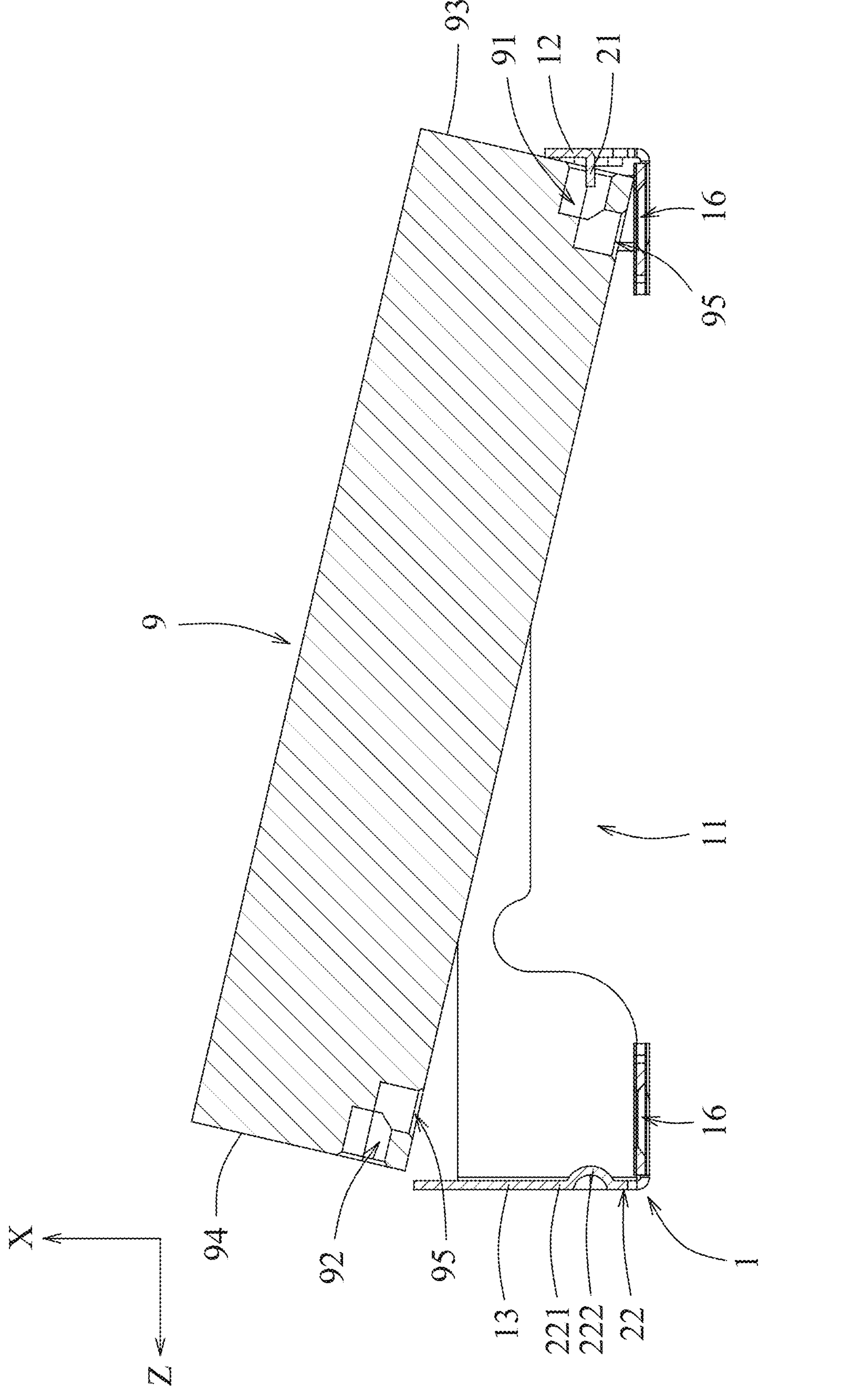
FIG. 7 is a sectional view taken along line VII-VII of FIG. 6.
Figure 8:
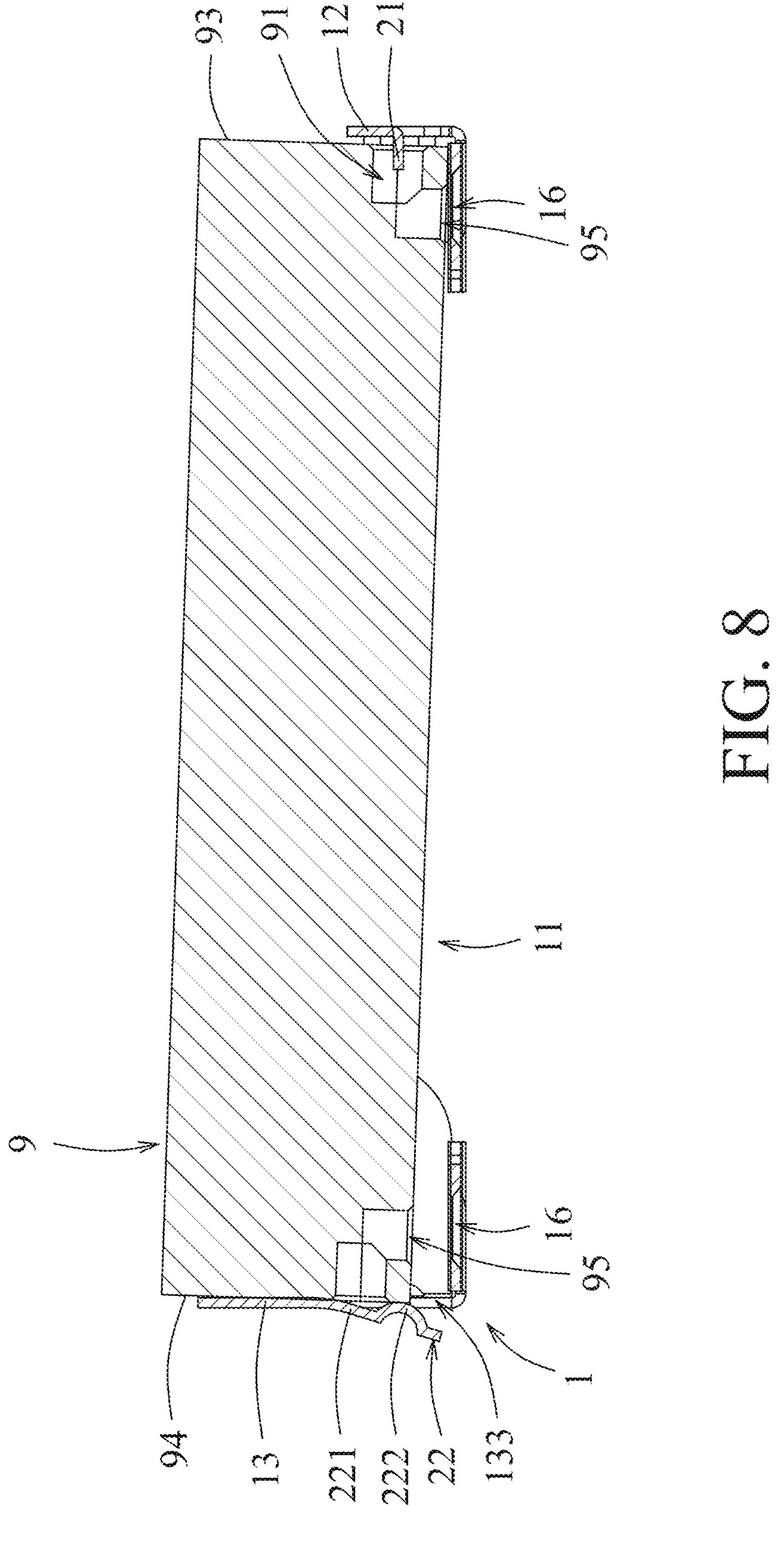
FIG. 8 is a view similar to FIG. 7, but illustrating the second side wall of the storage device being moved into the receiving space of the embodiment.
Figure 9:
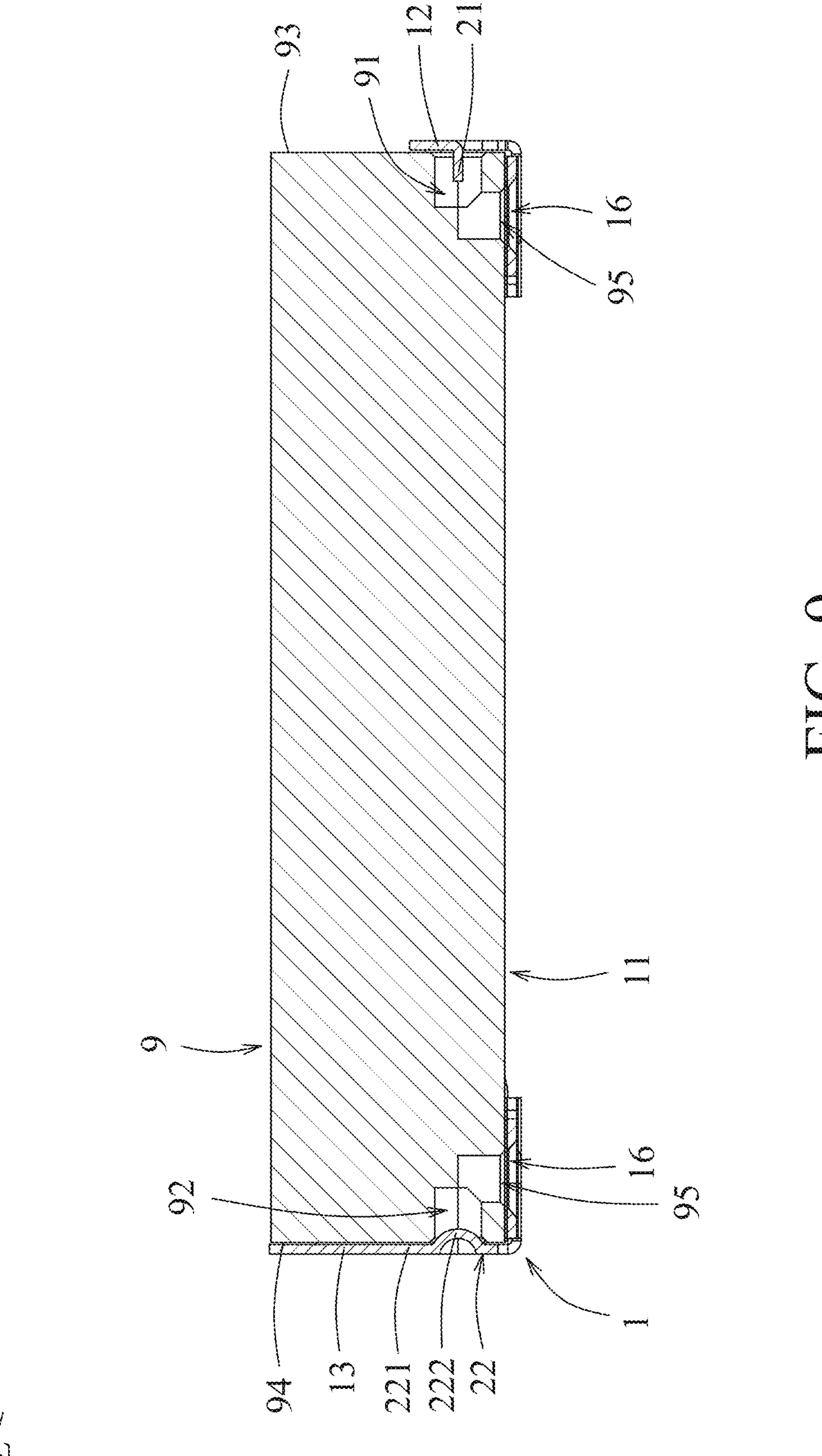
FIG. 9 is a sectional view taken along line IX-IX of FIG. 1.

A method of assembling and disassembling the storage device 9 to and from the storage device bracket 100 will be described in detail below. Firstly, as shown in FIGS. 6 and 7, the storage device 9 is moved obliquely from top to bottom toward the bracket body 1, and the first sidewall 93 thereof is inserted into the receiving space 11 such that the openings of the first grooves 91 are respectively aligned with the engaging hooks 21. Then, the first sidewall 93 of the storage device 9 is moved toward the first side frame 12 of the bracket body 1 so that the engaging hooks 21 can be inserted into the respective first grooves 91 to prevent movement of the first sidewall 93. Next, as shown in FIG. 8, the second sidewall 94 of the storage device 9 is inserted into the receiving space 11 from top to bottom, and pushes the protrusions 222 of the elastic engaging plates 22 through a bottom edge thereof to move the protrusions 222 together with the elastic plate portions 221 out of the receiving space 11. At this time, the elastic plate portions 221 of the elastic engaging plates 22 are elastically displaced away from the second side frame 13 and away from the receiving space 11 to generate elastic restoring forces. Finally, as shown in FIG. 9, as the second sidewall 94 is continuously pressed downward into the receiving space 11 until the openings of the second grooves 92 are respectively aligned with the protrusions 222, through the elastic restoring forces of the elastic plate portions 221, the protrusions 222 are driven to move into the receiving space 11 and respectively extend into the second grooves 92 so as to prevent movement of the second sidewall 94. As such, the movements of the first and second sidewalls 93, 94 of the storage device 9 are restricted, thereby securely mounting the storage device 9 on the storage device bracket 100. Afterwards, the fixing members or screws can be inserted into the respective through holes 16 to engage the respective fastening holes 95, thereby securely fixing the storage device 9 to the storage bracket device 100.

On the contrary, when it is desired to detach the storage device 9 from the storage device bracket 100, the fixing members or screws are first removed from the respective fastening holes 95 and the respective through holes 16, after which an upward force is applied to the bottom wall 97 of the storage device 9 at a position adjacent to the second sidewall 94 so that bottom walls of the second grooves 92 can respectively push the protrusions 222 of the elastic engaging plates 22 out of the receiving space 11. At this time, the elastic plate portions 221 are again elastically displaced away from the second side frame 13 so as to generate elastic restoring forces. Then, the upward force is continuously applied to the second sidewall 94 of the storage device 9 until the position of the second sidewall 94 is higher than the protrusions 222. At this time, through the elastic restoring forces of the elastic plate portions 221, the protrusions 222 are moved to return into the receiving space 11. Next, the storage device 9 is moved in a direction toward the second side frame 13 so as to move the first grooves 91 away from the respective engaging hooks 21. Since the first and second sidewalls 93, 94 of the storage device 9 are not restricted by the positioning assemblies 2, the storage device 9 can be moved out of the receiving space 11 and away from the storage device bracket 100.

With reference to FIG. 5, preferably, each elastic plate portion 221 has an inverted trapezoidal shape, that is, a width of each elastic plate portion 221 in the front-rear direction (Y) gradually decreases from top to bottom. As such, when each elastic plate portion 221 elastically displaces in the left-right direction (Z), an amount of elastic deformation of a bottom portion of the elastic plate portion 221 in the left-right direction (Z) is greater than an amount of elastic deformation of a top portion thereof in the left-right direction (Z), which is conducive to elastic deformation and not prone to breakage.

With reference to FIG. 7, preferably, a height of the first side frame 12 in the up-down direction (X) is lower than a height of the second side frame 13 in the up-down direction (X). As such, when the storage device 9 is inclined in the left-right direction (Z) (i.e., the position of the second sidewall 94 is higher than that of the first sidewall 93) and the first grooves 91 respectively receive the engaging hooks 21, a bottom portion of the first sidewall 93 is located in the receiving space 11, and a top portion thereof protrudes above the first side frame 12 and will not interfere with the first side frame 12, thereby facilitating assembling and disassembling of the storage device 9 to and from the storage device bracket 100.

With reference to FIG. 9, preferably, a longitudinal section of each protrusion 222 in the left-right direction (Z) is curved. When the protrusions 222 are pushed by the bottom edge of the second sidewall 94 or by the bottom walls of the second grooves 92, the bottom edge of the second sidewall 94 or the bottom walls of the second grooves 92 will slide along the curvatures of the protrusions 222, thereby facilitating movement of the storage device 9 relative to the protrusions 222.

In summary, with the engaging hooks 21 respectively inserted into the first grooves 91 and the protrusions 222 respectively inserted into the second grooves 92 so as to limit movement of the storage device 9 relative to the storage device bracket 100, the storage device bracket 100 can position the storage device 9 thereto without using screws, which is beneficial to reducing the overall assembly time and facilitating assembly of the storage device 9 to the storage device bracket 100. Therefore, the object of this disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A storage device bracket configured to hold and position a storage device, the storage device having a first groove and a second groove respectively provided on two opposite sides of the storage device, said storage device bracket, comprising:

a bracket body defining a receiving space for receiving the storage device; and at least one positioning assembly including an engaging hook and an elastic engaging plate respectively provided on two opposite sides of said bracket body, said engaging hook protruding from one of said two opposite sides of said bracket body into said receiving space and configured to be removably inserted into the first groove, said elastic engaging plate having an elastic plate portion, and a protrusion connected to and protruding from said elastic plate portion into said receiving space for insertion into the second groove so as to limit movement of the storage device relative to said storage device bracket, wherein the storage device includes a first sidewall having the first groove, and a second sidewall having the second groove, wherein, when the engaging hook is inserted into the first groove so as to position the first sidewall in the receiving space, and when the elastic engaging plate is pushed by the second sidewall through the protrusion to elastically displace the elastic plate portion away from the another one of the two opposite sides of the bracket body, the protrusion is moved along with the elastic plate portion away from the receiving space for allowing the second sidewall of the storage device to be inserted into or pulled out of the receiving space;

wherein the bracket body includes a first side frame and a second side frame opposite to each other in a left-right direction and cooperatively defining the receiving space, and wherein the second side frame has at least one through groove extending therethrough in the left-right direction, and the elastic plate portion extends downwardly from an upper wall of the at least one through groove, and is capable of elastic displacement in the left-right direction.

2. The storage device bracket as claimed in claim 1, wherein a height of said first side frame in an up-down direction is lower than a height of said second side frame in the up-down direction.

3. The storage device bracket as claimed in claim 1, wherein said engaging hook protrudes transversely from said first side frame.

4. The storage device bracket as claimed in claim 1, wherein said elastic plate portion has a width in a front-rear direction gradually decreasing from top to bottom.

5. The storage device bracket as claimed in claim 1, wherein a longitudinal section of said protrusion in the left-right direction is curved.

6. A storage device bracket configured to hold and position a storage device, the storage device having a first groove and a second groove respectively provided on two opposite sides of the storage device, said storage device bracket, comprising:

a bracket body defining a receiving space for receiving the storage device; and at least one positioning assembly including an engaging hook and an elastic engaging plate respectively provided on two opposite sides of said bracket body, said engaging hook protruding from one of said two opposite sides of said bracket body into said receiving space and configured to be removably inserted into the first groove, said elastic engaging plate having an elastic plate portion, and a protrusion connected to and protruding from said elastic plate portion into said receiving space for insertion into the second groove so as to limit movement of the storage device relative to said storage device bracket, wherein the storage device includes a first sidewall having the first groove, and a second sidewall having the second groove, wherein, when said engaging hook is inserted into the first groove so as to position the first sidewall in said receiving space, and when said elastic engaging plate is pushed by the second sidewall through said protrusion to elastically displace said elastic plate portion away from another one of said two opposite sides of said bracket body, said protrusion is moved along with said elastic plate portion away from said receiving space for allowing the second sidewall of the storage device to be inserted into or pulled out of said receiving space, wherein said bracket body includes a first side frame and a second side frame opposite to each other in a left-right direction and cooperatively defining said receiving space;

wherein the storage device further has at least one fastening hole formed in a bottom surface thereof, wherein said first side frame has a first upright plate extending in a front-rear direction, and a first bottom plate extending transversely from a bottom end of said first upright plate toward said second side frame in the left-right direction, said second side frame having a second upright plate extending in the front-rear direction, and a second bottom plate extending transversely from a bottom end of said second upright plate toward said first side frame in the left-right direction, and wherein said first upright plate, said first bottom plate, said second upright plate, and said second bottom plate cooperatively define said receiving space.

7. The storage device bracket as claimed in claim 6, wherein one of said first bottom plate and said second bottom plate is formed with at least one through hole extending therethrough in an up-down direction, said at least one through hole being configured to align with the at least one fastening hole for extension of a fixing member therethrough to engage with the at least one fastening hole so as to securely fix the storage device to said storage bracket device.

8. The storage device bracket as claimed in claim 6, wherein said bracket body further includes a third side frame connected between rear ends of said first side frame and said second side frame, and wherein said third side frame, said first upright plate, said first bottom plate, said second upright plate, and said second bottom plate cooperatively define said receiving space.

9. The storage device bracket as claimed in claim 8, wherein said bracket body further includes a fourth side frame connected between front ends of said first side frame and said second side frame, and wherein said third side frame, said fourth side frame, said first upright plate, said first bottom plate, said second upright plate, and said second bottom plate cooperatively define said receiving space.

10. The storage device bracket as claimed in claim 6, wherein a height of said first side frame in an up-down direction is lower than a height of said second side frame in the up-down direction.

11. The storage device bracket as claimed in claim 6, wherein said engaging hook protrudes transversely from said first side frame.

12. A storage device bracket configured to hold and position a storage device, the storage device having a first groove and a second groove respectively provided on two opposite sides of the storage device, said storage device bracket, comprising:

a bracket body defining a receiving space for receiving the storage device; and at least one positioning assembly including an engaging hook and an elastic engaging plate respectively provided on two opposite sides of said bracket body, said engaging hook protruding from one of said two opposite sides of said bracket body into said receiving space and configured to be removably inserted into the first groove, said elastic engaging plate having an elastic plate portion, and a protrusion connected to and protruding from said elastic plate portion into said receiving space for insertion into the second groove so as to limit movement of the storage device relative to said storage device bracket, wherein the storage device includes a first sidewall having the first groove, and a second sidewall having the second groove, wherein, when said engaging hook is inserted into the first groove so as to position the first sidewall in said receiving space, and when said elastic engaging plate is pushed by the second sidewall through said protrusion to elastically displace said elastic plate portion away from another one of said two opposite sides of said bracket body, said protrusion is moved along with said elastic plate portion away from said receiving space for allowing the second sidewall of the storage device to be inserted into or pulled out of said receiving space;

wherein the first sidewall has two first grooves respectively provided on front and rear ends thereof, and the second sidewall has two second grooves respectively provided on front and rear ends of the second sidewall, and wherein said at least one positioning assembly includes two positioning assemblies respectively disposed on front and rear sides of said bracket body, said engaging hooks of said two positioning assemblies respectively protruding from front and rear ends of said one of said two opposite sides of said bracket body into said receiving space, said elastic engaging plates of said positioning assemblies being respectively provided on front and rear ends of said another one of said two opposite sides of said bracket body.

13. The storage device bracket as claimed in claim 12, wherein said engaging hooks of said two positioning assemblies are configured to be inserted removably and respectively into the two first grooves, and said protrusions of said elastic engaging plates of said two positioning assemblies are configured to be respectively inserted into the two second grooves so as to limit movement of the storage device relative to said storage bracket device.

* * * * *